United States Patent

Wacher

[15] 3,638,060
[45] Jan. 25, 1972

[54] PHOSPHOR DISPLAY SCREEN AND FILTER INCLUDING PLATINUM AND MANGANESE CHLORIDE DERIVATIVES OF TETRAPHENYLPORPHIN

[72] Inventor: Paul Wacher, Bayside, N.Y.
[73] Assignee: GTE Laboratories Incorporated
[22] Filed: May 25, 1970
[21] Appl. No.: 41,134

[52] U.S. Cl..............................313/112, 313/92, 350/311, 252/300, 178/7.86
[51] Int. Cl.....................H01j 5/16, H01j 61/40, G01b 5/20
[58] Field of Search..........178/7.86; 313/92 PH, 112, 92 US, 313/92 X

[56] References Cited

UNITED STATES PATENTS 3,013,114 12/1961 Bridges....................................178/5.4
3,293,493 12/1966 Johnson et al........................315/358

*Primary Examiner*—Robert Segal
*Attorney*—Irving M. Kriegsman

[57] ABSTRACT

A high-contrast display apparatus adapted for viewing in an environment of ambient light. A display screen is provided for producing an image consisting of a narrow band of wavelengths in the green region of the spectrum. Overlaying the display screen is a filter which consists of a layer of didymium glass coated with a layer of acrylic ester polymer. The polymer contains metal derivatives of tetraphenylporphin. The filter substantially absorbs the visible wavelengths incident upon it which are outside the spectral band emitted by the display screen.

9 Claims, 3 Drawing Figures

3,638,060

PHOSPHOR DISPLAY SCREEN AND FILTER INCLUDING PLATINUM AND MANGANESE CHLORIDE DERIVATIVES OF TETRAPHENYLPORPHIN

BACKGROUND OF THE INVENTION

This invention relates to video displays and, more particularly, to a high-contrast display apparatus adapted for viewing in an environment of ambient light.

Video displays, such as cathode-ray tube displays, must sometimes be viewed in an environment of substantial ambient light. Ambient light reflected from the display screen degrades the contrast of the displayed image. For example, the contrast of a conventional television display is noticeably poorer when viewed in daylight than in a dark room. When a display must be viewed under conditions of intense ambient light it can be difficult to see the displayed image at all. This problem occurs, for example, when viewing a radar display located in the cockpit of an airplane which is exposed to sunlight.

Various solutions to the problem of adverse ambient light have been set forth. Light filters which utilize polarization and interference effects have been employed with some success. These filters are frequently designed to eliminate off-axis ambient light and should be viewed only from within a certain solid angle in front of the display screen. Also, these filters generally include precision thickness layers and/or polarizing elements which make them expensive. Another approach has been the use of absorption filters. The most basic absorption filter is a neutral density filter which absorbs the component wavelengths of the visible spectrum to about the same extent. The neutral density filter is placed, for example, in front of a television display tube. Ambient light rays pass first through the filter, are then reflected from the face of the tube and pass again from the filter, while the light emitted by the display tube passes only once through the filter. This provides an improvement in contrast under adverse ambient conditions, regardless of the spectral characteristics of the filter, since the ambient light is filtered twice and the emitted light only once. With this scheme, however, there is necessarily substantial undesirable attenuation of the light emission from the display.

A further suggested solution has been to use a selective absorption filter which has a light transmission characteristic designed to complement the light output characteristic of the display device. In other words, the selective filter should pass, with little attenuation, light of the wavelengths emitted by the display tube while substantially attenuating light of other wavelengths. This scheme, while sound in theory, has been of limited practical use because a good match between the phosphor emission and the filter is difficult to obtain. The emission from a display screen is typically the output spectrum of one or more phosphors. In a monochrome CRT display, such as a radarscope, the phosphor utilized is generally a green emitter since the eye has maximum sensitivity in the green portion of the visible spectrum.

Until recently, broadband green phosphors such as (Zn,Cd)S:Cu have been used to provide a sufficiently bright emission. The use of selective absorption filters in conjunction with broadband phosphors has not been generally successful. Firstly, narrow band selective absorption filters used in conjunction with these broadband phosphors have been found inadequate because they necessarily absorb a substantial part of the phosphor emission. Secondly, when a broadband type absorption filter is matched to a broadband phosphor the improvement in image contrast is marginal. Such marginal improvement results because the filter, being broadband to match the phosphor, fails to attenuate a sufficiently large percentage of the ambient light which hits the display screen. For a broadband green-emitting phosphor and filter combination this failure is especially pronounced since the matching filter does not sufficiently attenuate a broad spectral band of the ambient light which lies around the peak of the eye's sensitivity.

The development of very bright narrow-band or "line-emitting" phosphors, such as green-emitting LaOCl:Tb, gave rise to a suggested solution to the adverse ambient problem, i.e., matching a narrow band pass absorption filter to the phosphor emission characteristic. With this scheme it will be appreciated that the filter "fit" must be quite good to avoid unnecessary absorption of the narrow phosphor emission line while absorbing the wavelengths of ambient light which are near the emission line and to which the eye is very sensitive. The achievement of an adequate fit therefore requires close matching of the phosphor line-emission and the filter peak transmission as well as a steeply sloping filter transmission characteristic. An adequate fit has heretofore been difficult of attainment and, accordingly, it is an object of the present invention to provide a high-contrast display which utilizes a closely fitted combination of green emitter and absorption filter.

BRIEF SUMMARY OF THE INVENTION

The present invention is directed to a high-contrast display apparatus adapted for viewing in an environment of ambient light. Means are provided including a display screen which produces an image consisting of a narrow band of wavelengths in the green region of the spectrum. An optical filter is disposed in the optical path between the display screen and a viewer. The optical filter includes, in a series arrangement, a layer of neodymium-containing material and a layer of polymeric matrix which contains metal derivatives of tetraphenylporphin (TPP). (As used herein the term "series arrangement" means that both layers are disposed in the optical path between the display screen and the viewer). The optical filter substantially absorbs incident visible light which is outside the spectral band emitted by the display screen.

In a preferred embodiment of the invention the display screen contains a terbium-activated phosphor and the polymeric matrix contains a platinum derivative of TPP, a manganese chloride derivative of TPP, and a blue dye. Further features and advantages of the invention will become more readily apparent from the following detailed description when taken in conjunction with the accompanying drawings.

DESCRIPTION OF THE PREFERRED EMBODIMENT

Figure 1:
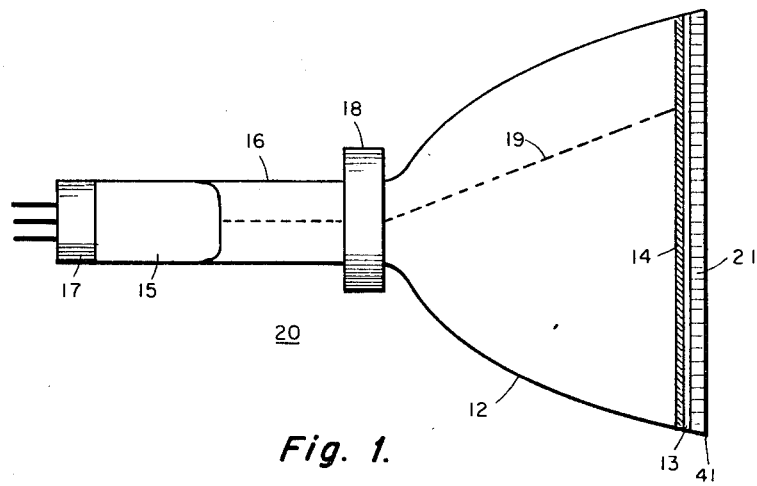
FIG. 1 is a cross-sectional view of a display apparatus in accordance with the invention.

Referring now to FIG. 1, there is shown a cathode-ray display tube 20 which consists of an evacuated envelope 12 having a glass faceplate 13 at one end. An electron gun 15 is typically mounted in the neck 16 of the tube 20 which is sealed by a tube socket 17 having pins for connection to energizing circuitry. Deflection means 18, for example a magnetic deflection yoke, is mounted on the neck 16 and used to scan the electron beam 19 produced by gun 15 across a display screen 14. The display screen 14 consists of a layer of a narrow-band green-emitting phosphor, such as LaOCl:Tb which is affixed to the internal surface of faceplate 13. A filter element 21 is mounted upon the outer surface of faceplate 13 so as to receive the light emitted by the screen 14 before its transmission to a viewer.

Figure 2:
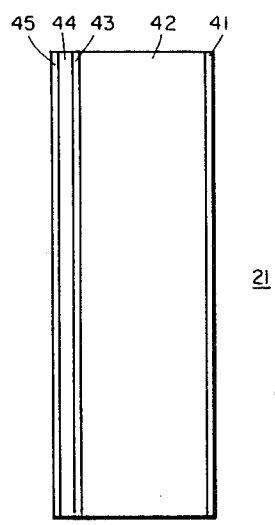
FIG. 2 is an enlarged view of the filter portion of the apparatus of FIG. 1.

An enlarged cross-sectional representation of filter element 21 is shown in FIG. 2. A plate 42 of didymium glass is coated on its outer surface with an antireflection coating 41. The inner surface of plate 42 is coated with layers 43, 44 and 45. Layer 44 consists of a polymeric matrix which contains metal derivatives of tetraphenylporphin (TPP) and a blue dye. (A family of optical filters which comprise polymeric matrices containing metal derivatives of TPP is disclosed in my copending U.S. Pat. application Ser. No. 41,133, filed May 25, 1970 filed of even date herewith and assigned to applicant's assignee). Layers 43 and 45 contain an ultraviolet screening agent to protect layer 44 from the deleterious effects of ultraviolet (UV) light originating from either inside or outside of the display tube. UV light has been found to have a degrading effect on the optical properties of the material of layer 44.

Figure 3:
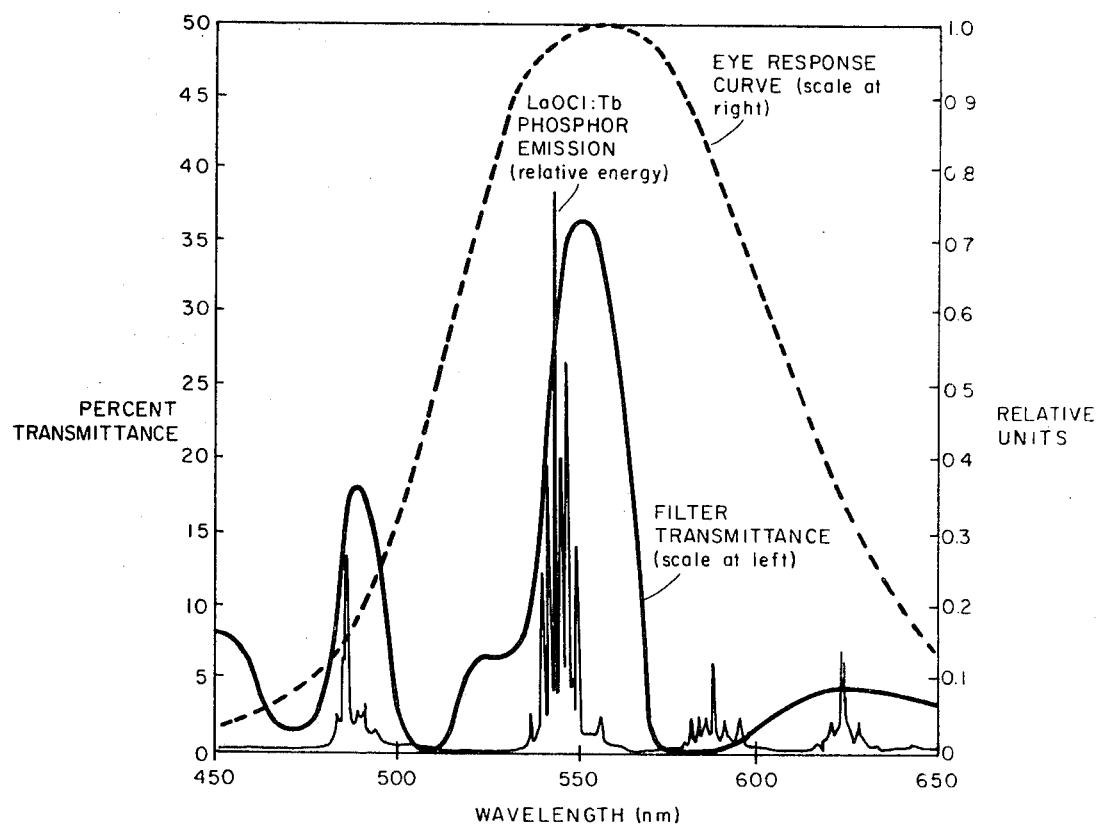
FIG. 3 is a graphical representation of phosphor emission and filter transmission for an apparatus in accordance with the invention.

FIG. 3 shows the emission spectrum of the green-emitting phosphor LaOCl:Tb. Also shown in the Figure is the transmission characteristic of the filter element 21, and an average human eye response curve. Layer 44 of the depicted filter element 21 consists of an acrylic ester polymer which contains platinum derivative of TPP ("PtTPP"), manganese chloride derivative of TPP ("MnClTPP"), and a blue dye (solvent blue 48). The filter transmission characteristic is seen to be a close match with the phosphor's primary emission band at about 550 nm. The filter is highly selective having a half-height bandwidth of about 25 nm, and it strongly absorbs wavelengths which are near to but do not correspond to the primary phosphor emission band. The importance of absorbing these near wavelengths can be appreciated by observing that the human eye is particularly sensitive to the near-green wavelengths of the spectrum. The filter absorbs ambient wavelengths to which the eye is particularly sensitive and thereby prevents their being reflected off the display screen and degrading image contrast. As a measure of this capability, the overall transmittance of the filter element for a double pass through the filter (i.e., with total reflectance of light transmitted in the first pass) was determined to be 2.2 percent for tungsten light (3,100° K) and 2.5 percent for daylight (6,600° K).

The filter element 21 is made as follows: The material for layers 43 and 45 is prepared by dissolving 0.2 percent by weight of a substituted benzotriazole UV screening agent (e.g., Geigy Tinuvin–328) in a 10 percent solution of acrylic ester polymer in ethylene glycol monomethyl ether (E.G.M.E.). The solution is sprayed on one side of a 5.5 mm. thick plate (42) of didymium glass (e.g., Corning No. 5120) which had been previously coated on its other side with an antireflection layer (41). The coated plate is then baked at 145° C. to form layer 43. Layer 44 is next made by first preparing the following solutions:

a. 0.5 mg. PtTPP/ml. benzene
b. 1.0 mg. MnClTPP/ml. benzene
c. 1.0 mg. blue dye/ml. (1:1 benzene/E.G.M.E.) (solvent blue 48)

These solutions are each added to a 40 percent solution of acrylic ester polymer in E.G.M.E. and additional amounts of E.G.M.E. are added to improve the spraying properties of the solutions which then consist of the following:

|  | Parts by Weight |
|---|---|
| A. PtTPP in benzene | 1.5 |
| 40% polymer in E.G.M.E. | 1.0 |
| E.G.M.E. | 2.0 |
| B. MnClTPP in benzene | 2.5 |
| 40% polymer in E.G.M.E. | 1.0 |
| E.G.M.E. | 1.0 |
| C. Dye Solution | 2.5 |
| 40% polymer in E.G.M.E. | 1.0 |
| E.G.M.E. | 1.0 |

These solutions are sprayed on top of layer 43 and the coated plate is baked at 145° C. to remove the solvents and produce a dry acrylic ester polymer film. The next layer (45) of UV screening agent is applied in the manner used in applying layer 43 as described above. The completed filter element 21 can be mounted of the faceplate 13 by using a conventional laminating resin.

What is claimed is:

1. A high-contrast display apparatus adapted for viewing in an environment of ambient light comprising:
   a. a phosphor display screen which produces an image consisting of a narrow band of wavelengths in the green region of the spectrum; and
   b. an optical filter disposed in the path between said display screen and a viewer, said filter comprising, in a series arrangement, a layer of neodymium-containing material and a layer of polymeric matrix which contains platinum tetraphenylporphin and manganese chloride tetraphenylporphin.

2. A display apparatus as defined by claim 1 wherein said polymeric matrix is an acrylic ester polymer.

3. A display apparatus as defined by claim 2 wherein said phosphor display screen comprises a terbium-activated phosphor.

4. A display apparatus as defined by claim 3 wherein said terbium-activated phosphor is LaOCl:Tb the layer of polymeric matrix further contains a blue dye.

5. A high-contrast display apparatus adapted for viewing in an environment of ambient light comprising:
   a. a cathode-ray display tube which includes a transparent faceplate having a phosphor emissive of a narrow band of wavelengths in the green region of the spectrum affixed to the inner surface thereof; and
   b. an optical filter overlying said faceplate, said filter comprising a layer of didymium glass having coated thereon a layer of acrylic ester polymer which contains PtTPP, MnClTPP and a blue dye.

6. A display apparatus as defined by claim 6 additionally comprising a layer of ultraviolet screening material overlaying said polymer layer.

7. A display apparatus as defined by claim 6 additionally comprising another layer of ultraviolet screening material disposed between said glass layer and said polymer layer.

8. A display apparatus as defined by claim 7 wherein said phosphor is a terbium-activated phosphor.

9. A display apparatus as defined by claim 8 wherein said phosphor is LaOCl:Tb.

* * * * *